(12) United States Patent
Viswanathan et al.

(10) Patent No.: US 12,670,242 B2
(45) Date of Patent: Jun. 30, 2026

(54) PRE-OS AUTHENTICATION

(71) Applicant: Dell Products L.P., Round Rock, TX (US)

(72) Inventors: Ganesh Kuppuswamy Viswanathan, Round Rock, TX (US); Nelson Cheng, Cedar Park, TX (US); Volker Nadolski, Kempen (DE)

(73) Assignee: Dell Products L.P., Round Rock, TX (US)

( * ) Notice: Subject to any disclaimer, the term of this patent is extended or adjusted under 35 U.S.C. 154(b) by 774 days.

(21) Appl. No.: 17/975,142

(22) Filed: Oct. 27, 2022

(65) Prior Publication Data

US 2024/0143723 A1     May 2, 2024

(51) Int. Cl.
*G06F 21/57* (2013.01)
*G06F 21/43* (2013.01)
*H04L 9/32* (2006.01)

(52) U.S. Cl.
CPC .............. *G06F 21/43* (2013.01); *G06F 21/57* (2013.01); *H04L 9/3228* (2013.01)

(58) Field of Classification Search
None
See application file for complete search history.

(56) References Cited

U.S. PATENT DOCUMENTS

2015/0269369 A1* 9/2015 Hamid .................... G06F 21/45
                                                              726/5
2016/0148597 A1* 5/2016 Hamid .................... G06F 21/31
                                                            345/173
2021/0209205 A1* 7/2021 Baldwin ............... G06F 21/604

* cited by examiner

*Primary Examiner* — Nelson S. Giddins
(74) *Attorney, Agent, or Firm* — Jackson Walker L.L.P.

(57) ABSTRACT

An information handling system may include at least one processor, an input device, and a display device. The information handling system may be configured to: prior to booting an operating system, display a displayable identifier on the display device, wherein the displayable identifier encodes information indicative of a system identifier of the information handling system, a time, and an encrypted shared secret, and wherein the displayable identifier is usable by a mobile information handling system to determine an access password for the information handling system; and in response to receiving the access password at the input device, booting the operating system.

18 Claims, 5 Drawing Sheets

PRE-OS AUTHENTICATION

TECHNICAL FIELD

The present disclosure relates in general to information handling systems, and more particularly to authentication of a user prior to initialization of an operating system (OS).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is advantageous in some situations to be able to prevent unauthorized access to an information handling system by authenticating a user prior to initialization of an operating system (OS). Such authentication may occur in a pre-OS environment such as a Basic Input/Output System (e.g., a Unified Extensible Firmware Interface (UEFI) BIOS). For example, security-conscious operators may require pre-OS authentication in situations such as automated teller machines (ATMs), systems in which authentication is used to decrypt a storage device prior to booting to an OS, etc. In other embodiments, authentication as described herein may occur in the context of an OS, a firmware, or any other system that gates access to an information handling system.

Some solutions may include mechanisms such as a BIOS boot password or a storage decryption password which needs to be typed in before the system boots. However, such fixed passwords may not be satisfactory, because users often choose weak passwords and may not rotate their passwords, and also because some systems may have a minimal input device such as a numeric keypad, limiting configurability once deployed.

On the other hand, central management of boot passwords may not be practical, because not all systems have network and/or management access. For example, even if a system such as an automated teller machine (ATM) is networked, it still might not be suitable for systems management tasks like password changes. Additionally, the use of a virtual private network (VPN) or the like may restrict the types of management that can be accomplished remotely.

Further, centrally rotated passwords may require scheduled downtime and need to be communicated to authorized users, and users may need a way to store or remember rotated passwords securely without writing them down and sharing them carelessly.

Accordingly, embodiments of this disclosure may provide improvements by implementing a pre-OS authentication system that uses a time-based one-time password (TOTP)-style rotating password based on a shared secret.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with pre-OS authentication may be reduced or eliminated.

In accordance with embodiments of the present disclosure, an information handling system may include at least one processor, an input device, and a display device. The information handling system may be configured to: prior to booting an operating system, display a displayable identifier on the display device, wherein the displayable identifier encodes information indicative of a system identifier of the information handling system, a time, and an encrypted shared secret, and wherein the displayable identifier is usable by a mobile information handling system to determine an access password for the information handling system; and in response to receiving the access password at the input device, booting the operating system.

In accordance with these and other embodiments of the present disclosure, a method may include an information handling system displaying a displayable identifier on a display device prior to booting an operating system, wherein the displayable identifier encodes information indicative of a system identifier of the information handling system, a time, and an encrypted shared secret, and wherein the displayable identifier is usable by a mobile information handling system to determine an access password for the information handling system; and in response to receiving the access password at an input device, the information handling system booting the operating system.

In accordance with these and other embodiments of the present disclosure, an article of manufacture may include a non-transitory, computer-readable medium having computer-executable code thereon that is executable by a processor of an information handling system for: displaying a displayable identifier on a display device prior to booting an operating system, wherein the displayable identifier encodes information indicative of a system identifier of the information handling system, a time, and an encrypted shared secret, and wherein the displayable identifier is usable by a mobile information handling system to determine an access password for the information handling system; and in response to receiving the access password at an input device, booting the operating system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
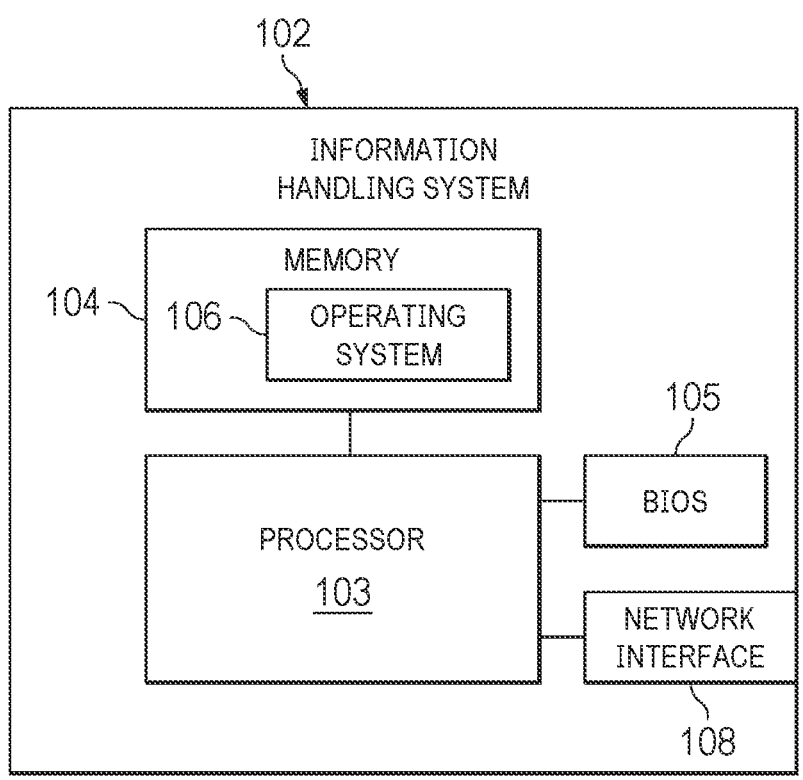
FIG. 1 illustrates a block diagram of an example information handling system, in accordance with embodiments of the present disclosure.

Preferred embodiments and their advantages are best understood by reference to FIGS. 1 through 5, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/ or elements of an information handling system.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile and/or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

As discussed above, embodiments of this disclosure may leverage a rotating password such as a TOTP in a pre-OS environment. In one embodiment, a shared secret may be provisioned on an information handling system during its deployment and/or during use, and the secret may then be used to generate passwords. An authorized user may receive the shared secret at a mobile device (e.g., via mobile device provisioning such as an app installed on a phone). The app may then be used to scan a displayable identifier such as a quick response (QR) code, a bar code, or any other suitable identifier displayed on the information handling system (e.g., on a display device such as a monitor). For the sake of clarity and concreteness, the example of QR codes will be discussed in detail herein. However, one of ordinary skill in the art with the benefit of this disclosure will understand its applicability to other displayable identifiers.

As discussed herein, based on the displayed QR code, the app may be configured to generate the TOTP that is needed to boot and access the information handling system. The QR code may include information such as the information handling system's service tag, the local time, and an encrypted version of the shared secret. Such information may be used to derive a TOTP that is the same on the information handling system and on the phone app. Any suitable technique (e.g., hashing, a key derivation function, etc.) may be used to determine the TOTP.

According to some embodiments, during factory deployment, a public/private key pair may be generated to encrypt the shared secret. Each information handling system may be securely provisioned with the public key and the shared secret. In one embodiment, the shared secret may be identical across multiple information handling systems (e.g., a text string specific to a manufacturer), while in other embodiments, unique secrets may be used for each information handling system. In one embodiment, the public/private key pair may be identical across multiple information handling systems (e.g., specific to a manufacturer), while in other embodiments, unique key pairs may be used for each information handling system.

The shared secret and the private key may also be saved securely at a central authentication system, along with the service tag of each information handling system, and data indicating which users should be allowed to boot and access each system.

Some embodiments may also be employed in scenarios other than booting and accessing an ordinary information handling system. For example, the information handling system may be embodied in a rental car. The rental car may be assigned to a customer by provisioning the customer's account with the car's shared secret. The car may present a QR code, which the customer may scan with a phone app. The customer may then drive the car without requiring any manual approval by an agent. The car need not be connected to the internet for this procedure, and the shared secret can be revoked (e.g., manually or based on a time-out), after which the customer will no longer be able to access the car.

Figure 2:
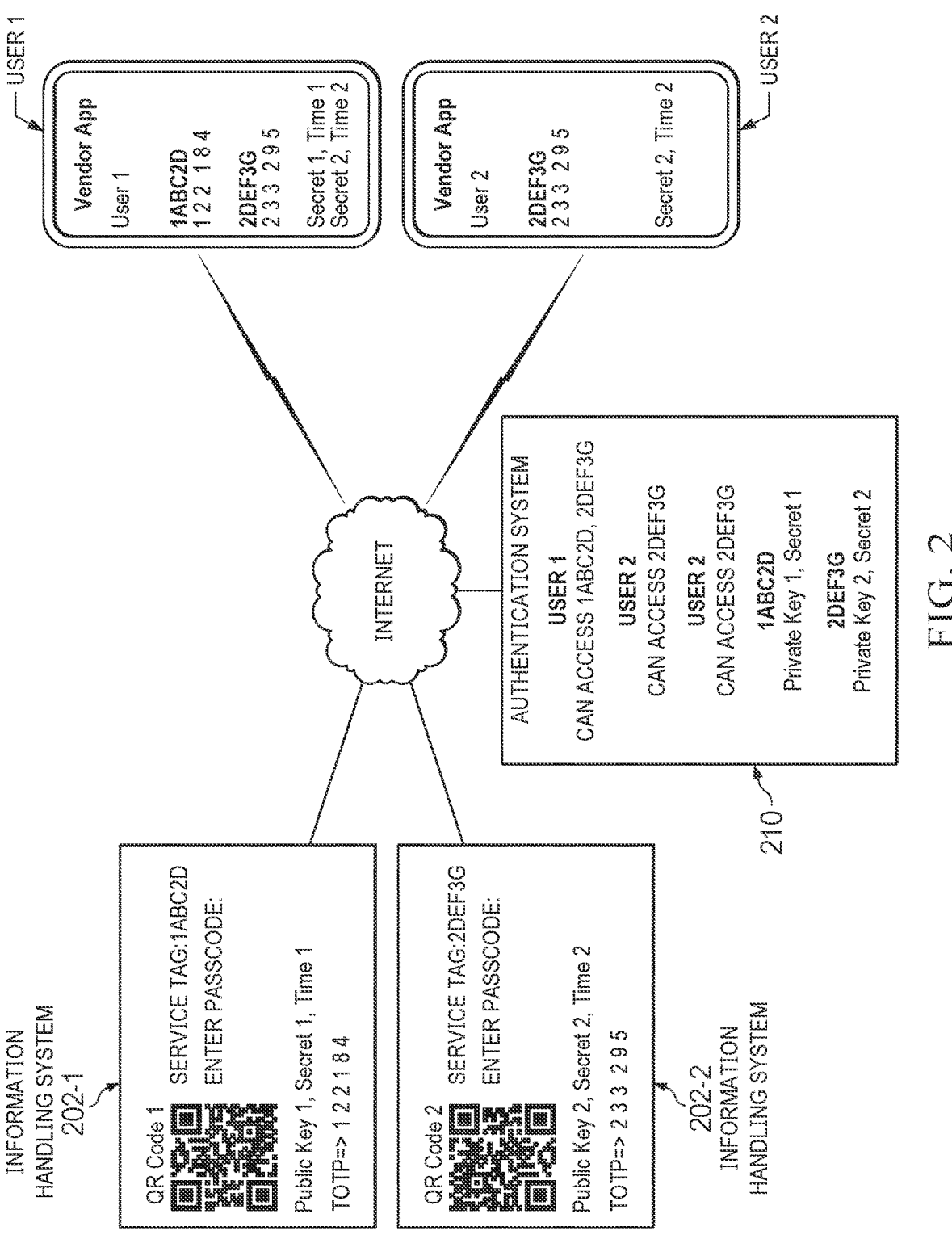
FIG. 2 illustrates a block diagram of example information handling systems being accessed by different users, in accordance with embodiments of the present disclosure.

Turning now to FIG. 2, an embodiment is shown in which information handling systems 202-1 and 202-2 (collectively, information handling systems 202) implement pre-OS authentication according to this disclosure. The authentication may be managed via a central authentication system 210, and User 1 and User 2 may attempt to gain access to either of information handling systems 202. In the embodiment shown, authentication system 210 stores information indicating that User 1 should be granted access to either of information handling systems 202, while User 2 should be granted access only to information handling system 202-2. In the embodiment shown, information handling systems 202 are connected to the internet, but this need not be the case in all embodiments. In some implementations, information handling systems 202 may be non-networked, and the techniques discussed herein may still be applicable.

Information handling systems 202 may periodically generate QR codes based on their shared secret(s). For example, information handling system 202-1 may combine its service tag identifier 1ABC2D with the current local time and an encrypted version of its shared secret, and QR Code 1 may incorporate that data. Similarly, information handling system 202-2 may combine its service tag identifier 2DEF3G with its current local time and an encrypted version of its shared secret, and QR Code 2 may incorporate that data. In some embodiments, the local time may be sampled at a desired frequency (e.g., once per minute) so that the QR code changes quickly enough to be suitable for TOTP purposes, but not so quickly as to cause difficulties for the users.

In operation, information handling system 202-1 may generate a TOTP passcode using the local time and the shared secret, prompting User 1 to enter that passcode. In order to access information handling system 202-1, User 1 may use a mobile device app to scan QR Code 1 that is being displayed by information handling system 202-1.

The app may then communicate with authentication system 210, transmitting a login request including the service tag and encrypted shared secret. Authentication system 210 may attempt to decrypt the encrypted shared secret using the associated private key. If the result matches the known shared secret for that service tag, and if the records at authentication system 210 confirm that User 1 should be granted access to information handling system 202-1, then authentication system 210 may determine that the request is valid.

Authentication system 210 may then securely provision the shared secret onto the phone app for User 1. The phone app may then generate a TOTP of 122184 using the provisioned shared secret and the local time, which should match the current TOTP of information handling system 202-1. When User 1 enters the TOTP at the boot login prompt of information handling system 202-1, access should be granted. User 1 may then type in the passcode on information handling system 202-1, which will verify that it matches and proceed with normal boot (e.g., decrypting any storage resources as needed).

The ability for this embodiment to share the system local time via the QR code allows for correct TOTP generation even if information handling system 202-1 experiences clock drift (e.g., due to hardware failure or being offline for an extended period an unable to contact a network time server). In particular, User 1 may rescan the QR code to re-synchronize with the local time maintained by information handling system 202-1 if the time drifts beyond the synchronization window.

Figure 3:
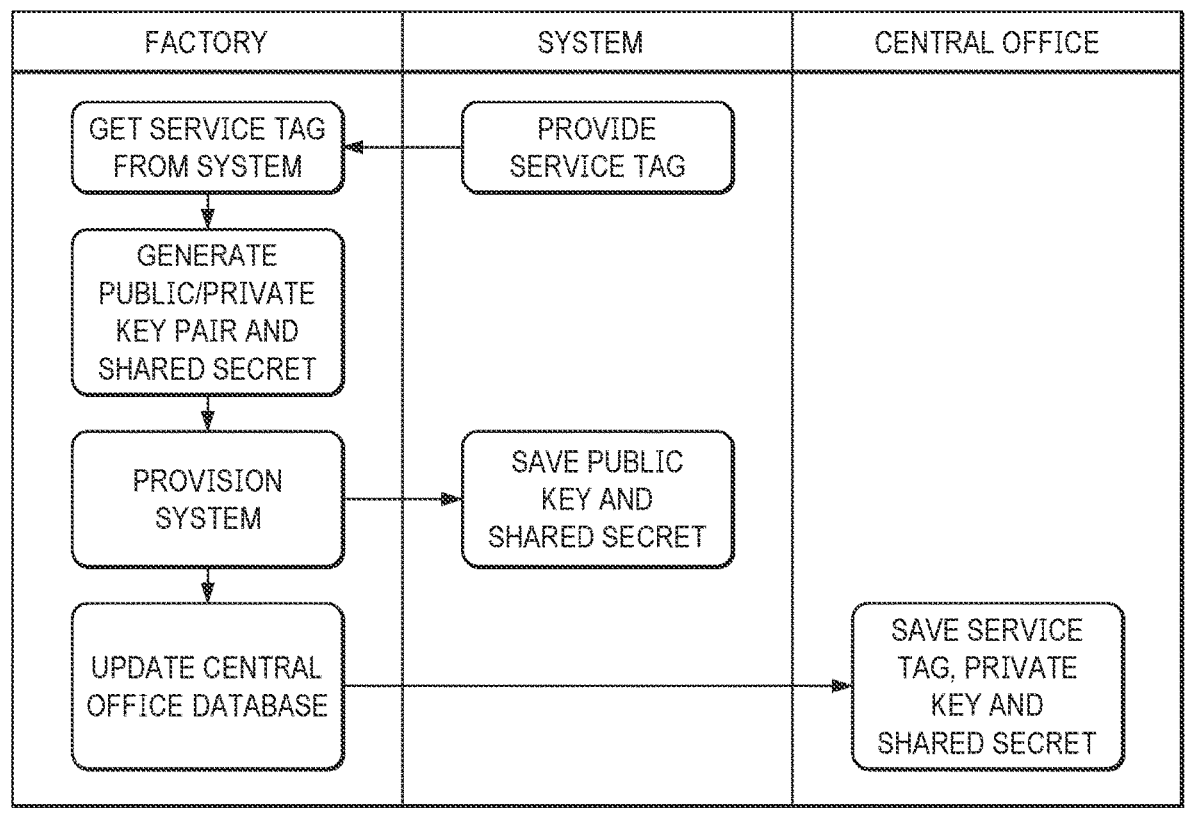
FIGS. 3-5 illustrate example methods, in accordance with embodiments of the present disclosure.

Turning now to FIG. 3, an example method 300 is shown for factory provisioning of an information handling system, according to some embodiments.

As shown, factory processing systems may generate a public/private key pair and a shared secret for the information handling system based on its service tag. The information handling system may then be provisioned with the public key and shared secret, and a central office system (e.g., a server, a cloud system, or the like) may store the service tag, private key, and shared secret.

Figure 4:
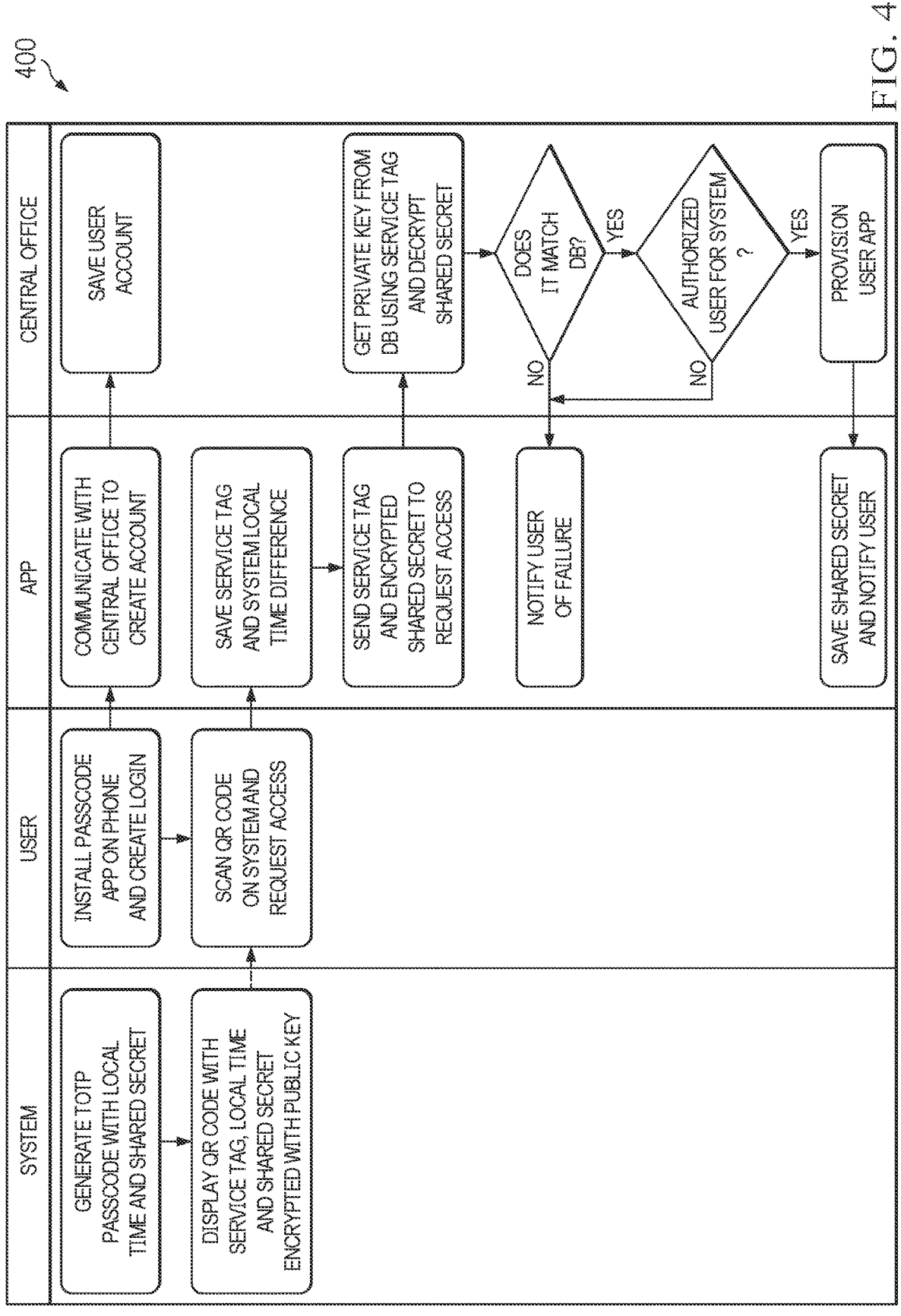

Turning now to FIG. 4, an example method 400 is shown for user provisioning of a phone app, according to some embodiments.

As shown, the user may install a passcode app, which may be used to communicate with a central office system to set up an account for the user. The app may then scan a QR code displayed on the information handling system. The QR code may incorporate the information handling system's service tag, local time, and shared secret encrypted with the public key.

The app may then receive the information handling system's shared secret from the central office, if the user is intended to be able to access the system.

Figure 5:
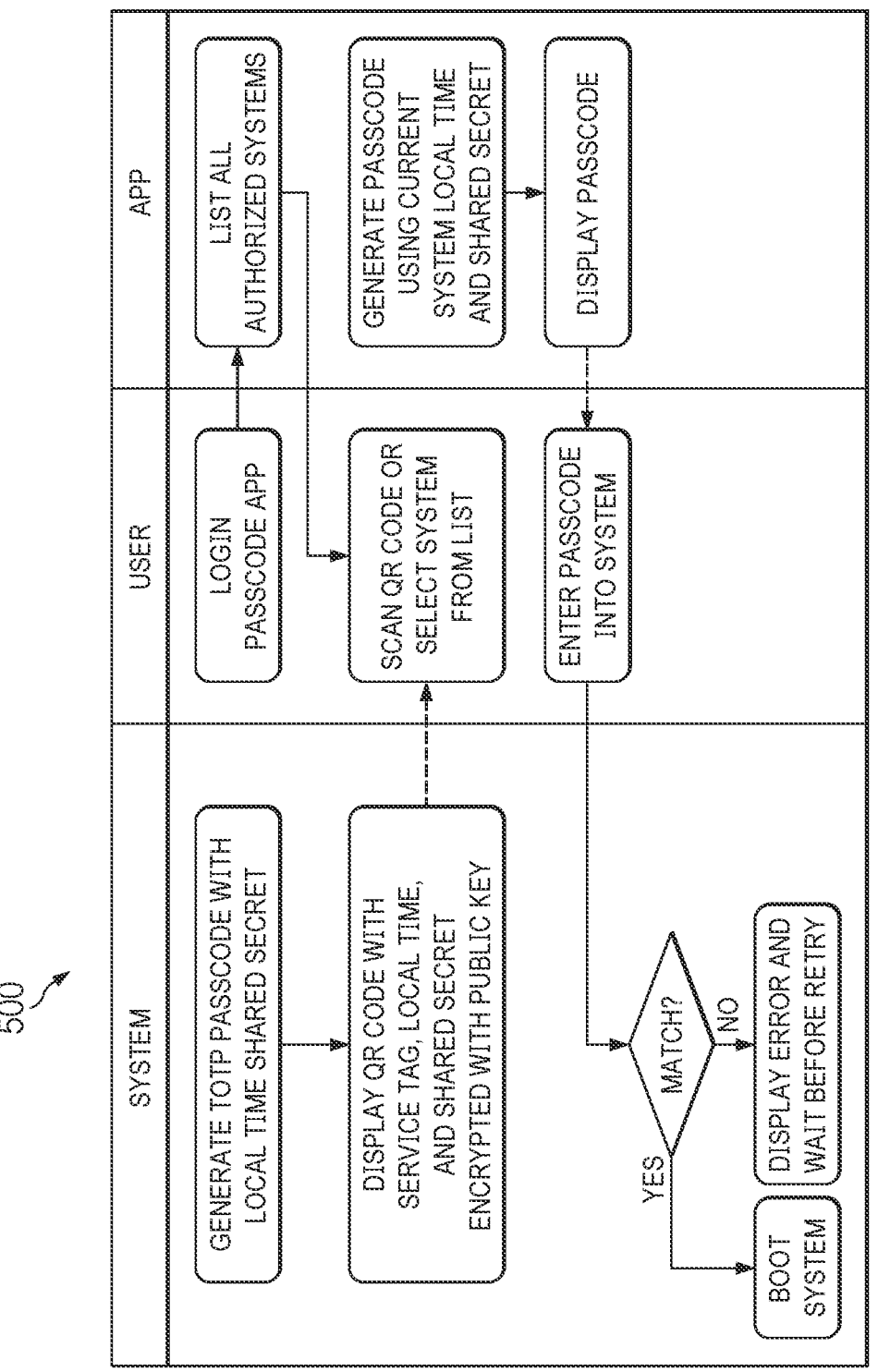

Turning now to FIG. 5, an example method 500 is shown for unlocking an information handling system, according to some embodiments.

Once the app has been provisioned (e.g., as shown in FIG. 4), no further network access may be necessary in some implementations. The user may scan a QR code of the information handling system. The app may then generate the correct passcode corresponding to the information handling system, and the user may use that passcode to obtain access.

One of ordinary skill in the art with the benefit of this disclosure will understand that the preferred initialization point for the methods depicted in FIGS. 3-5 and the order of the steps comprising the methods may depend on the implementation chosen. In these and other embodiments, the methods may be implemented as hardware, firmware, software, applications, functions, libraries, or other instructions.

Further, although FIGS. 3-5 disclose a particular number of steps to be taken with respect to the disclosed methods, the methods may be executed with greater or fewer steps than depicted. The methods may be implemented using any of the various components disclosed herein (such as the components of FIG. 1), and/or any other system operable to implement the methods.

Embodiments may thus provide many benefits. Embodiments may avoid the need for unencrypted transmission of a shared secret. Embodiments may also be convenient for users, requiring only an ordinary phone app to scan a QR code, rather than requiring a user to remember or securely store a password. There is also no need for the user to manually rotate passwords. Further, multiple users may be granted access to a system without having to share a common secret.

Embodiments may also be convenient for administrators and allow for access revocation when a user no longer needs access to an information handling system.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
at least one processor;
an input device; and
an electronic display device;
wherein the information handling system is configured to:
receive a shared secret during provisioning, wherein the shared secret is also stored at a remote information handling system, and wherein the remote information handling system stores data indicative of users authorized to access the information handling system;
prior to booting an operating system, display a displayable identifier on the electronic display device, wherein the displayable identifier encodes information indicative of a system identifier of the information handling system, a time, and an encrypted version of the shared secret, and wherein the displayable identifier is usable by a mobile information handling system to determine an access password for the information handling system by transmitting the system identifier and the encrypted version of the shared secret to the remote information handling system, the remote information handling system being configured to return the access password to the mobile information handling system in response to a user of the mobile information handling system being included in the data indicative of users authorized to access the information handling system; and in response to receiving the access password at the input device, booting the operating system.

2. The information handling system of claim 1, wherein the electronic display device is a monitor.

3. The information handling system of claim 1, wherein the input device is a keyboard.

4. The information handling system of claim 1, wherein the displayable identifier is displayed by a Unified Extensible Firmware Interface (UEFI) Basic Input/Output System (BIOS) of the information handling system.

5. The information handling system of claim 1, further configured to allow access to an encrypted storage resource in response to receiving the access password at the input device.

6. The information handling system of claim 1, wherein the mobile information handling system is a smartphone.

7. A method comprising:

an information handling system receiving a shared secret during provisioning, wherein the shared secret is also stored at a remote information handling system, and wherein the remote information handling system stores data indicative of users authorized to access the information handling system;

the information handling system displaying a displayable identifier on an electronic display device prior to booting an operating system, wherein the displayable identifier encodes information indicative of a system identifier of the information handling system, a time, and an encrypted version of the shared secret, and wherein the displayable identifier is usable by a mobile information handling system to determine an access password for the information handling system by transmitting the system identifier and the encrypted version of the shared secret to the remote information handling system, the remote information handling system being configured to return the access password to the mobile information handling system in response to a user of the mobile information handling system being included in the data indicative of users authorized to access the information handling system; and in response to receiving the access password at an input device, the information handling system booting the operating system.

8. The method of claim 7, wherein the electronic display device is a monitor.

9. The method of claim 7, wherein the input device is a keyboard.

10

10. The method of claim 7, wherein the displayable identifier is displayed by a Unified Extensible Firmware Interface (UEFI) Basic Input/Output System (BIOS) of the information handling system.

11. The method of claim 7, further comprising allowing access to an encrypted storage resource in response to receiving the access password at the input device.

12. The method of claim 7, wherein the mobile information handling system is a smartphone.

13. An article of manufacture comprising a non-transitory, computer-readable medium having computer-executable code thereon that is executable by a processor of an information handling system for:

receiving a shared secret during provisioning, wherein the shared secret is also stored at a remote information handling system, and wherein the remote information handling system stores data indicative of users authorized to access the information handling system;

displaying a displayable identifier on an electronic display device prior to booting an operating system, wherein the displayable identifier encodes information indicative of a system identifier of the information handling system, a time, and an encrypted version of the shared secret, and wherein the displayable identifier is usable by a mobile information handling system to determine an access password for the information handling system by transmitting the system identifier and the encrypted version of the shared secret to the remote information handling system, the remote information handling system being configured to return the access password to the mobile information handling system in response to a user of the mobile information handling system being included in the data indicative of users authorized to access the information handling system; and in response to receiving the access password at an input device, booting the operating system.

14. The article of claim 13, wherein the electronic display device is a monitor.

15. The article of claim 13, wherein the input device is a keyboard.

16. The article of claim 13, wherein the displayable identifier is displayed by a Unified Extensible Firmware Interface (UEFI) Basic Input/Output System (BIOS) of the information handling system.

17. The article of claim 13, wherein the code is further executable for allowing access to an encrypted storage resource in response to receiving the access password at the input device.

18. The article of claim 13, wherein the mobile information handling system is a smartphone.

* * * * *